United States Patent
Sim et al.

(10) Patent No.: US 12,050,491 B2
(45) Date of Patent: *Jul. 30, 2024

(54) SUPPORTING MEMBER FOR DISPLAY DEVICE, DISPLAY DEVICE COMPRISING THE SAME, AND METHOD FOR MANUFACTURING THEREOF

(71) Applicant: Samsung Display Co., LTD., Yongin-si (KR)

(72) Inventors: Jin Yong Sim, Seongnam-si (KR); Min Su Kim, Hwaseong-si (KR); Jai Ku Shin, Hwaseong-si (KR); Mun Sik Ham, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,210

(22) Filed: Apr. 28, 2023

(65) Prior Publication Data
US 2023/0273644 A1    Aug. 31, 2023

Related U.S. Application Data

(63) Continuation of application No. 17/668,682, filed on Feb. 10, 2022, now Pat. No. 11,681,330.

(30) Foreign Application Priority Data

May 31, 2021    (KR) ........................ 10-2021-0070347

(51) Int. Cl.
*G06F 3/041*    (2006.01)
*G06F 1/16*    (2006.01)

(52) U.S. Cl.
CPC .......... *G06F 1/1652* (2013.01); *G06F 3/0412* (2013.01); *G06F 2203/04102* (2013.01)

(58) Field of Classification Search
CPC ................ G06F 1/1652; G06F 3/0412; G06F 2203/04102; G09F 9/301
See application file for complete search history.

(56) References Cited

U.S. PATENT DOCUMENTS 6,464,905 B1    10/2002 Lu
9,983,424 B2    5/2018 Kim et al.
(Continued)

FOREIGN PATENT DOCUMENTS

CN    107976725    5/2018
CN    211742521    10/2020
(Continued)

OTHER PUBLICATIONS

Extended European Partial Search Report—European Patent Application No. 22164951.0 dated Sep. 20, 2022, citing references listed within.

*Primary Examiner* — Joe H Cheng
(74) *Attorney, Agent, or Firm* — CANTOR COLBURN LLP

(57) ABSTRACT

The present disclosure relates to a supporting member for a display device, a display device including the same, and a manufacturing method of a supporting member for a display device. The supporting member for the display device according to an embodiment includes: a first region and a second region, and a third region positioned between the first region and the second region and made of a non-metal material. The supporting member includes a plurality of patterns positioned in the third region and adjacent to one another along a first direction and a second direction perpendicular to the first direction, where each of the plurality of patterns extends along the second direction.

20 Claims, 23 Drawing Sheets

(56) References Cited

U.S. PATENT DOCUMENTS

| | | | |
|---|---|---|---|
| 10,056,443 B2 | 8/2018 | Shyu et al. | |
| 10,074,824 B2 | 9/2018 | Han et al. | |
| 10,164,208 B2 | 12/2018 | Lee et al. | |
| 10,368,452 B2 | 7/2019 | Yun et al. | |
| 10,754,382 B2 | 8/2020 | Nam et al. | |
| 11,031,563 B1 | 6/2021 | Li | |
| 11,442,202 B2 | 9/2022 | Park et al. | |
| 11,470,734 B2 | 10/2022 | Sim et al. | |
| 11,487,327 B2 * | 11/2022 | Horiuchi | G06F 1/1641 |
| 11,551,586 B2 | 1/2023 | Ha et al. | |
| 11,681,330 B2 * | 6/2023 | Sim | G06F 1/1641 345/173 |
| 11,823,595 B2 * | 11/2023 | Wang | H05K 7/1438 |
| 2014/0226275 A1 | 8/2014 | Ko et al. | |
| 2015/0346866 A1 | 12/2015 | Kusunok et al. | |
| 2016/0105950 A1 | 4/2016 | Drzaic et al. | |
| 2018/0081219 A1 | 3/2018 | Kim et al. | |
| 2018/0097197 A1 | 4/2018 | Han et al. | |
| 2018/0150108 A1 | 5/2018 | Song | |
| 2019/0132947 A1 * | 5/2019 | Koo | G09F 9/301 |
| 2019/0207141 A1 | 7/2019 | Kim et al. | |
| 2019/0229282 A1 | 7/2019 | Zhang et al. | |
| 2020/0209998 A1 | 7/2020 | Shin et al. | |
| 2020/0273379 A1 | 8/2020 | Wang et al. | |
| 2020/0295282 A1 | 9/2020 | Xiang | |
| 2020/0319672 A1 * | 10/2020 | Kim | G06F 1/1656 |
| 2021/0004048 A1 | 1/2021 | Ha et al. | |
| 2021/0034180 A1 | 2/2021 | Hirotsugu et al. | |
| 2021/0152678 A1 | 5/2021 | Jang et al. | |
| 2021/0165454 A1 * | 6/2021 | Dong | G06F 1/1652 |
| 2021/0208709 A1 | 7/2021 | Shin et al. | |
| 2021/0294443 A1 | 9/2021 | Kim et al. | |
| 2022/0050321 A1 | 2/2022 | Park et al. | |
| 2022/0075470 A1 | 3/2022 | Shin et al. | |
| 2022/0103670 A1 * | 3/2022 | Liao | H04M 1/0216 |
| 2022/0147107 A1 | 5/2022 | Wang et al. | |
| 2022/0147170 A1 | 5/2022 | Park | |
| 2022/0151085 A1 | 5/2022 | Jung et al. | |
| 2022/0238049 A1 | 7/2022 | Min | |
| 2023/0008810 A1 | 1/2023 | Shin et al. | |

FOREIGN PATENT DOCUMENTS

| | | |
|---|---|---|
| EP | 3301506 | 4/2018 |
| EP | 3678354 | 7/2020 |
| JP | H07114879 | 5/1995 |
| JP | 2021026775 | 2/2021 |
| KR | 100766337 | 10/2007 |
| KR | 101071420 | 10/2011 |
| KR | 101142631 | 5/2012 |
| KR | 1020160017843 | 2/2016 |
| KR | 101797925 | 11/2017 |
| KR | 1020210013867 | 2/2021 |
| WO | 2020060134 | 3/2020 |
| WO | 2020113756 | 6/2020 |
| WO | 2020204247 | 10/2020 |

* cited by examiner

SUPPORTING MEMBER FOR DISPLAY DEVICE, DISPLAY DEVICE COMPRISING THE SAME, AND METHOD FOR MANUFACTURING THEREOF

This application is a continuation of U.S. patent application Ser. No. 17/668,682, filed on Feb. 10, 2022, now U.S. Pat. No. 11,681,330 B2, which claims priority to Korean Patent Application No. 10-2021-0070347, filed on May 31, 2021, and all the benefits accruing therefrom under 35 U.S.C. § 119, the content of which in its entirety is herein incorporated by reference.

BACKGROUND

1. Field

The present disclosure relates to a supporting member for a display device, a display device including the same, and a manufacturing method of a supporting member for a display device.

2. Description of the Related Art

A display device is a device for displaying an image, and includes a liquid crystal display ("LCD"), an organic light emitting diode ("OLED") display, or the like. The display device is used in various electronic devices such as a mobile phone, a navigation device, a digital camera, an electronic book, a portable game machine, and various terminals.

Such a display device may further include a digitizer that detects a touched position when the screen is touched and converts it into digital data to be input. Accordingly, a predetermined signal may be input by touching the displayed screen of the display device with a hand or a pen.

The display device may be formed in various forms such as being capable of bending, curving, or folding.

SUMMARY

It is desirable for the supporting member to be made of a material having high rigidity and flexibility in the portion where the display device is folded.

Embodiments are to provide a supporting member for a display device that may prevent interference of signals between the display panel and the digitizer, may not electrically affect the display panel and the digitizer, and has excellent flexibility in some regions while increasing overall strength, a display device including the same, and a manufacturing method of a supporting member for the display device.

A supporting member for a display device according to an embodiment, including a first region and a second region, and a third region positioned between the first region and the second region and made of a non-metal material, includes a plurality of patterns positioned in the third region and adjacent to one another along a first direction and a second direction perpendicular to the first direction, where each of the plurality of patterns extends along the second direction.

The third region may be foldable along a folding axis parallel to the second direction, each of the plurality of patterns may have a length greater than a width in a plan view, and the length may be measured in the second direction, and the width may be measured in the first direction.

A space between two patterns of the plurality of patterns adjacent in the second direction may be adjacent to a center of a pattern of the plurality of patterns adjacent in the first direction.

Each of the plurality of patterns may be a groove or hole.

Each of the plurality of patterns may have a shape such that the width gradually becomes narrower toward a bottom thereof on a cross-section.

The supporting member for the display device may be formed of or include at least one of a carbon fiber reinforced plastic, a glass fiber reinforced plastic, and an aramid fiber reinforced plastic.

A display device according to an embodiment includes: a display panel which displays an image; a digitizer which detects a touch; and a supporting member positioned between the display panel and the digitizer and made of a non-metal material. The supporting member includes a first region, a second region, and a third region positioned between the first region and the second region, the supporting member includes a plurality of patterns positioned in the third region and adjacent to one another in a first direction and a second direction perpendicular to the first direction, and each of the plurality of patterns extends along the second direction.

The third region may be foldable with respect to a folding axis extended in the second direction, each of the plurality of patterns may have a length greater than a width in a plan view, and the length may be measured in the second direction, and the width may be measured in the first direction.

A space between two patterns of the plurality of patterns adjacent in the second direction may be adjacent to a center of a pattern of the plurality of patterns adjacent in the first direction.

Each of the plurality of patterns may be a groove or hole.

Each of the plurality of patterns may have a shape such that the width gradually becomes narrower toward a bottom thereof on a cross-section.

The supporting member for the display device may be formed of or include at least one of a carbon fiber reinforced plastic, a glass fiber reinforced plastic, and an aramid fiber reinforced plastic.

The digitizer may include a first digitizer overlapping the first region of the supporting member and a second digitizer overlapping the second region of the supporting member, and the first digitizer and the second digitizer may be separated from each other.

The display device according to an embodiment may further include a metal plate positioned under the digitizer, the metal plate may include a first metal plate overlapping the first region of the supporting member and a second metal plate overlapping the second region of the supporting member, and the first metal plate and the second metal plate may be separated from each other.

A manufacturing method of a supporting member for a display device according to an embodiment includes: preparing a precursory supporting member made of a non-metal material; attaching a dry film on the precursory supporting member; patterning the dry film; processing the precursory supporting member by using the patterned dry film as a mask through a micro blast process to form a plurality of patterns on the precursory supporting member, where the precursory supporting member becomes a supporting member after the processing; and removing the patterned dry film.

The supporting member may include a first region, a second region, and a third region disposed between the first region and the second region, a plurality of patterns may be disposed in the third region and adjacent to one another in the first direction and the second direction perpendicular to the first direction, and each of the plurality of patterns may extend along the second direction.

The third region may be foldable with respect to a folding axis extended in the second direction, each of the plurality of patterns may have a length greater than a width in a plan view, and the length may be measured in the second direction, and the width may be measured in the first direction.

A space between two patterns of the plurality of patterns adjacent in the second direction may be adjacent to a center of a pattern of the plurality of patterns adjacent in the first direction.

Each of the plurality of patterns may be a groove or hole.

Each of the plurality of patterns may have a shape such that the width gradually becomes narrower toward a bottom on a cross-section.

The supporting member for the display device may be formed of or include at least one of a carbon fiber reinforced plastic, a glass fiber reinforced plastic, and an aramid fiber reinforced plastic.

The supporting member for the display device may be configured to be disposed between a display panel which displays an image and a digitizer which detects a touch.

According to embodiments, the interference of the signal between the display panel and the digitizer may be prevented by the supporting member positioned between the display panel and the digitizer, the display panel and the digitizer may not be electrically affected, and the overall strength is high, while in some regions, flexibility may be great.

DETAILED DESCRIPTION

Figure 1:
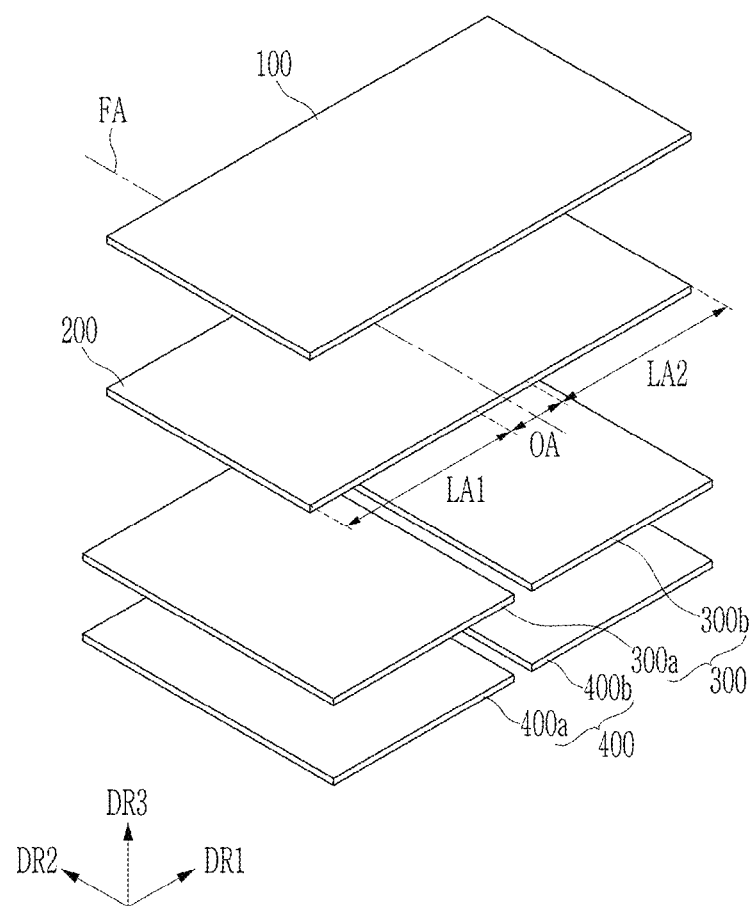
FIG. 1 is an exploded perspective view of a display device according to an embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Descriptions of parts not related to the present invention are omitted, and like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above, and the phrase "on a cross-section" means when a cross-section taken by vertically cutting an object portion is viewed from the side.

Hereinafter, a display device according to an embodiment is described with reference to FIG. 1 to FIG. 3.

Figure 2:
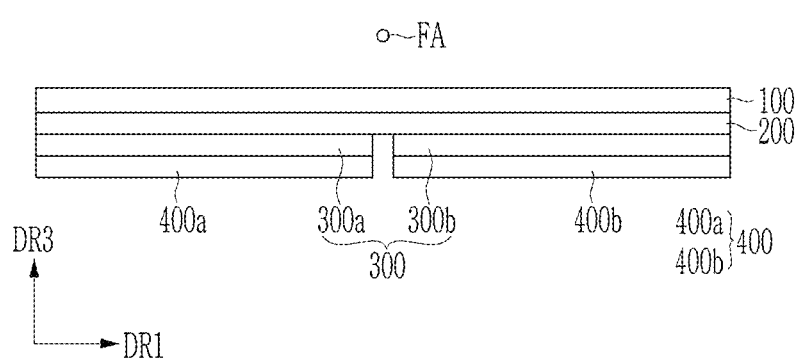
FIG. 2 is a cross-sectional view of a display device according to an embodiment.
Figure 3:
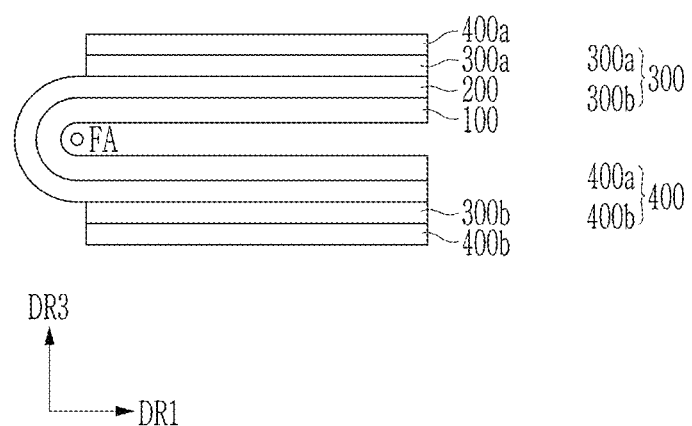
FIG. 3 is a cross-sectional view showing a state of folding a display device according to an embodiment.

FIG. 1 is an exploded perspective view of a display device according to an embodiment, FIG. 2 is a cross-sectional view of a display device according to an embodiment, and FIG. 3 is a cross-sectional view showing a state folding a display device according to an embodiment.

As shown in FIG. 1 to FIG. 3, a display device according to an embodiment includes display panel 100 for displaying an image, a digitizer 300 for detecting a touch, and a supporting member 200 positioned between the display panel 100 and the digitizer 300.

The display panel 100 may have a rectangle shape including two sides parallel to a first direction DR1 and two sides parallel to a second direction DR2 perpendicular to the first direction DR1 on a plane (i.e., in a plan view: a view from a third direction DR3). However, the flat shape of the display panel 100 is only an example and the shape of the display panel 100 may be changed in various ways. For example, the display panel 100 may have shapes of polygons, circles, ellipses, etc. Also, the corner of the display panel 100 may be chamfered with a curved line or a straight line in another embodiment. The display panel 100 may have a predetermined thickness along the third direction DR3 perpendicular to the first direction DR1 and the second direction DR2.

The display panel 100 is made of a flexible material and may be changed into various shapes. The display panel 100 may be flexible, stretchable, foldable, bendable, or rollable. In the present embodiment, a case where the display panel 100 is foldable is mainly described. FIG. 2 shows the display device according to an embodiment before a folding, and FIG. 3 shows the display device according to an embodiment after folding.

The display panel 100 may be folded along a folding axis FA parallel to the second direction DR2. In the state that the display panel 100 is folded, the parts of the display panel 100 positioned on opposite sides of the folding axis FA may face each other. At this time, the display panel 100 may be folded so that the image-displayed surfaces face each other. However, the present invention is not limited thereto, and the surfaces on which the image is displayed may be positioned outside in another embodiment. In other words, the display panel 100 may be folded so that the surfaces on which no image is displayed face each other. In addition, the parts of the display panel 100 positioned on opposite sides of the folding axis FA may be folded to have a predetermined angle. For example, the parts of the display panel 100 positioned on opposite sides of the folding axis FA may be fixed in a state having an angle of about 45 degrees, about 90 degrees, or about 135 degrees.

The display panel 100 may be made of an organic light emitting panel. A plurality of pixels including a transistor and a light emitting diode (LED) connected thereto may be positioned on the substrate of the display panel 100. A plurality of pixels may be disposed in various forms, and for example, may be arranged in a matrix form along the first direction DR1 and the second direction DR2 in the substrate of the display panel 100. However, the type of the display panel 100 is not limited thereto, and may be formed of various types of panels. For example, the display panel 100 may be formed of or include a liquid crystal panel, an electrophoretic display panel, an electrowetting display panel, or the like. In addition, display panel 100 may be made of a next-generation display panel such as a micro light emitting diode (LED) (Micro LED) display panel, a quantum dot light emitting diode (LED) ("QLED") display panel, and a quantum dot organic light emitting diode ("QD-OLED") display panel.

Although not shown, a polarization layer, a cover window, etc. may be further positioned on the display panel 100.

The supporting member 200 may be positioned below the display panel 100. The supporting member 200 and the display panel 100 may overlap each other so that they are adjacent to each other in the third direction DR3. The supporting member 200 may have a flat shape similar to the display panel 100. For example, the supporting member 200 may have a rectangle shape including two sides parallel to the first direction DR1 and two sides parallel to the second direction DR2 perpendicular to the first direction DR1 on a plane. However, the present invention is not limited thereto, and the planar shape of the supporting member 200 and the planar shape of the display panel 100 may be different from each other in another embodiment.

The supporting member 200 is made of a flexible material and may be changed into various shapes. The supporting member 200 may be flexible, stretchable, foldable, bendable, or rollable. In the present embodiment, the case where the supporting member 200 is foldable is mainly explained. The supporting member 200 may be folded along the folding axis FA parallel to the second direction DR2. The supporting member 200 may include a first region LA1 and a second region LA2, and a third region OA positioned between the first region LA1 and the second region LA2. The third region OA of the supporting member 200 may be folded along the folding axis FA. The first region LA1 and the second region LA2 of the supporting member 200 are not folded and may maintain a flat shape.

Although not shown, an adhesive member may be positioned between the display panel 100 and the supporting member 200, and the supporting member 200 may be attached to the display panel 100 by the adhesive member. When the display device according to an embodiment is folded, the display panel 100 and the supporting member 200 are fixed to each other and may be folded together.

The supporting member 200 may be made of a non-metal material. For example, the supporting member 200 may be made of a carbon fiber reinforced plastic ("CFRP") in an embodiment. The carbon fiber reinforced plastic is a composite material of a plastic that is made by mixing a carbon fiber or a fabric made of a carbon fiber and a synthetic resin. In a state in which the carbon fibers are permeated in a polymer (plastic) matrix according to a predetermined process, the carbon fibers provide high tensile strength and rigidity, and the polymer matrix wraps the fibers to maintain their shape as a structural material and simultaneously imparts impact resistance. The carbon fiber reinforced plastic is very light and has no corrosion and simultaneously has tensile strength of 5-10 times that of iron and safety.

The carbon fiber reinforced plastic has little heat shrinkage or heat expansion, so it has high dimensional accuracy and excellent electrical and thermal conductivity, and has excellent characteristics in terms of low density, friction wear characteristic, X-ray permeability, electromagnetic wave shielding, biocompatibility, and flexibility. By positioning the supporting member 200 made of the material having these characteristics between the display panel 100 and the digitizer 300, interference of the signals between the display panel 100 and the digitizer 300 may be effectively prevented, and the display panel 100 and the digitizer 300 may not be electrically affected from each other. In addition, the high strength of the supporting member 200 may protect the display panel 100 and the digitizer 300.

The material of the supporting member 200 is not limited thereto, and may be replaced with another material having high strength and high electrical shielding properties. For example, the supporting member 200 may be made of a glass fiber reinforced plastic ("GFRP") or an aramid fiber reinforced plastic ("AFRP"). The glass fiber reinforced plastic is made by mixing a glass fiber with a polyester resin and hardening them, and has high heat resistance and high mechanical strength. Aramid fiber-reinforced plastic is a plastic reinforced by using aramid-based fibers and has excellent wear resistance.

The digitizer 300 is a device that encodes and inputs the positional relationship of a picture or a figure, and when a pen is moved on the upper surface of the display device according to an embodiment, coordinate information thereof is converted into digital data and input. The digitizer 300 may be used to input drawings, diagrams, design drawings, etc. The digitizer 300 may be positioned below the supporting member 200. The digitizer 300 and the supporting member 200 may overlap each other so as to be adjacent in the third direction DR3.

The digitizer 300 may overlap both the flat part of the display panel 100 and the flat part of the supporting member 200, and may not overlap the folded part of the display panel 100 and the folded part of the supporting member 200 (See FIG. 3). The digitizer 300 may not overlap at least part of the third region OA of the supporting member 200. The digitizer 300 may include a first digitizer 300a and a second digitizer 300b. The first digitizer 300a may overlap the first region LA1 of the supporting member 200, and the second digitizer 300b may overlap the second region LA2 of the supporting member 200. The first digitizer 300a and the second digitizer 300b are separate from each other. However, the present invention is not limited thereto, and the first digitizer 300a and the second digitizer 300b may be connected in another embodiment. For example, the end of the first digitizer 300a and the end of the second digitizer 300b may be connected. In this case, the connection portion of the first digitizer 300a and the second digitizer 300b may overlap the third region OA of the supporting member 200.

The first digitizer 300a and the second digitizer 300b may each have a rectangle shape including two sides parallel to the first direction DR1 and two sides parallel to the second direction DR2 on a plane (i.e., in a plan view). However, the present invention is not limited thereto, and the planar shapes of the first digitizer 300a and the second digitizer 300b may be variously changed in another embodiment. In a state in which the display device is unfolded, the first digitizer 300a and the second digitizer 300b may be adjacent to each other in the first direction DR1. When the display device is folded, the first digitizer 300a and the second digitizer 300b may be adjacent to each other in the third direction DR3, and may overlap each other in the third direction DR3.

The display device according to an embodiment may further include a metal plate 400. The metal plate 400 may be positioned under the digitizer 300. The metal plate 400 may serve to protect the digitizer 300 and the display panel 100. The metal plate 400 may be formed of or include a metal material.

The metal plate 400 may overlap the flat portion of the display panel 100 and the supporting member 200 and may not overlap the folded portion of the display panel 100 and the supporting member 200. The metal plate 400 may not overlap at least a portion of the third region OA of the supporting member 200. The metal plate 400 may include a first metal plate 400a and a second metal plate 400b. The first metal plate 400a may overlap the first region LA1 of the supporting member 200, and the second metal plate 400b may overlap the second region LA2 of the supporting member 200. The first metal plate 400a and the second metal plate 400b may be separated from each other. However, the present invention is not limited thereto, and the end of the first metal plate 400a and the end of the second metal plate 400b may be connected. In this case, the connection portion of the first metal plate 400a and the second metal plate 400b may overlap the third region OA of the supporting member 200.

The first metal plate 400a and the second metal plate 400b may each have a rectangular shape including two sides parallel to the first direction DR1 and two sides parallel to the second direction DR2 on a plane. However, the present invention is not limited thereto, and the flat shape of the first metal plate 400a and the second metal plate 400b may be variously changed. In the state in which the display device is unfolded, the first metal plate 400a and the second metal plate 400b may be adjacent in the first direction DR1. In the state in which the display device is folded, the first metal plate 400a and the second metal plate 400b may be adjacent in the third direction DR3 and overlap each other.

Hereinafter, the supporting member 200 of the display device according to an embodiment is described in detail with reference to FIG. 4 to FIG. 6.

Figure 4:
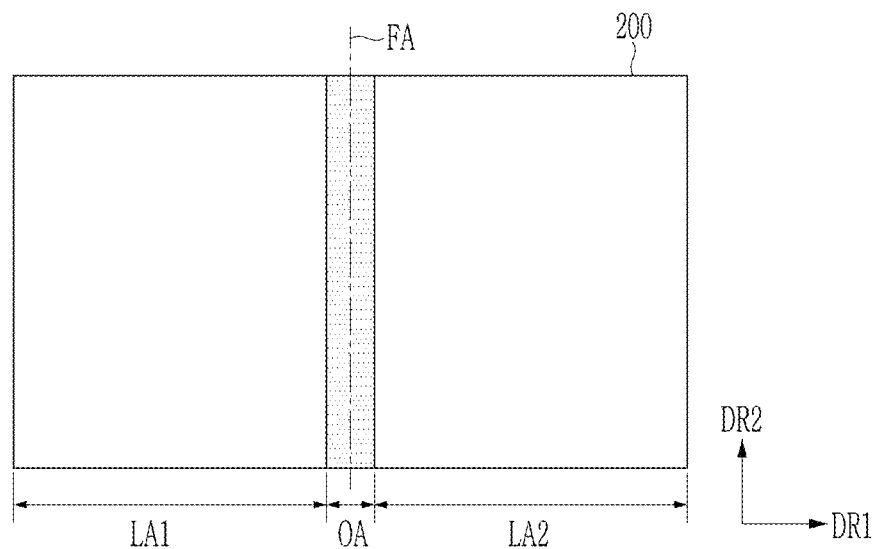
FIG. 4 is a top plan view showing a supporting member of a display device according to an embodiment.
Figure 5:
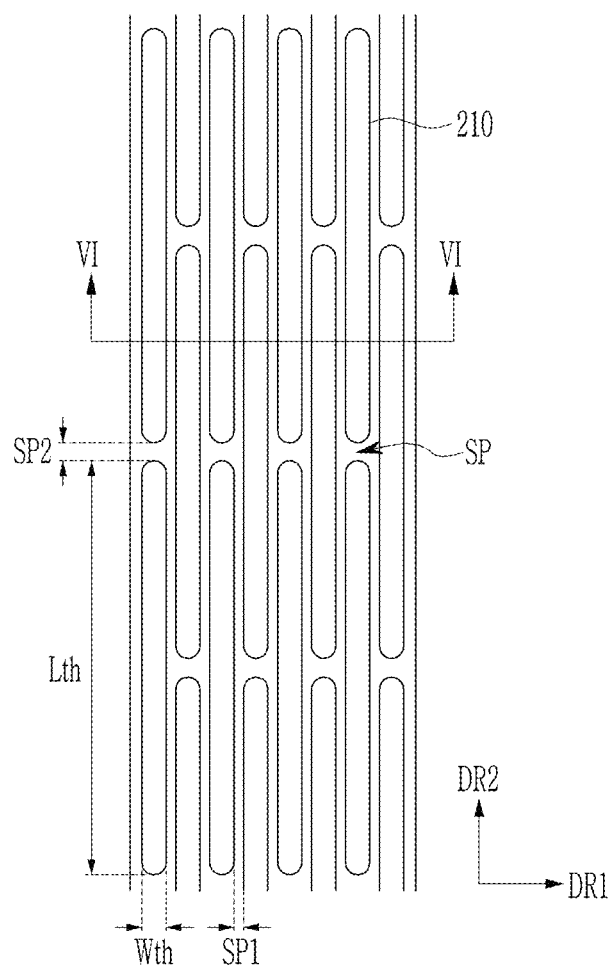
FIG. 5 is a top plan view showing a part of a supporting member of a display device according to an embodiment.
Figure 6:
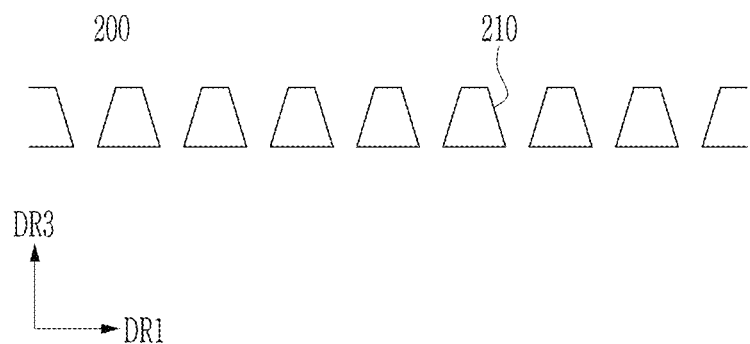
FIG. 6 is a cross-sectional view of a supporting member of a display device according to an embodiment taken along line VI-VI of FIG. 5.

FIG. 4 is a top plan view showing a supporting member of a display device according to an embodiment, FIG. 5 is a top plan view showing a part of a supporting member of a display device according to an embodiment, and FIG. 6 is a cross-sectional view of a supporting member of a display device according to an embodiment taken along line VI-VI of FIG. 5. FIG. 5 and FIG. 6 show a part of the third region of the supporting member.

As shown in FIG. 4, the supporting member 200 may include a first region LA1 and a second region LA2, and a third region OA positioned between the first region LA1 and the second region LA2. The third region OA of the supporting member 200 may be folded along the folding axis FA. In the state in which the display device is unfolded, the first region LA1 and the second region LA2 may be adjacent in the first direction DR1. In the state in which the display device is folded, the first region LA1 and the second region LA2 may be adjacent in the third direction DR3 and overlap each other.

As shown in FIG. 5 and FIG. 6, a plurality of patterns 210 may be positioned in the third region OA of the supporting member 200. A plurality of patterns 210 may be disposed to be adjacent along the first direction DR1 and the second direction DR2 on a plane.

Each of the plurality of patterns 210 may have a bar shape extending to be elongated in the second direction DR2 on a plane (i.e., in a plan view). That is, the pattern 210 may extend to be elongated in the direction parallel to the folding axis FA. The pattern 210 may have a shape including two sides parallel to the second direction DR2 and two rounded portions connecting opposite ends of the two sides on a plane. In the pattern 210 on a plane, the length Lth may be larger than the width Wth of the pattern 210. The length Lth of the pattern 210 may be measured in the second direction DR2, and the width Wth may be measured in the first direction DR1. A plurality of patterns 210 adjacent in the first direction DR1 are spaced apart from each other at a predetermined interval SP1. A plurality of patterns 210 adjacent in the second direction DR2 are spaced apart from each other at a predetermined interval SP2. The interval SP2 between the patterns 210 adjacent in the second direction DR2 may be different from the interval SP1 between the patterns 210 adjacent in the first direction DR1. The interval SP2 between the patterns 210 adjacent in the second direction DR2 may be larger than the interval SP1 between the patterns 210 adjacent in the first direction DR1. The interval SP1 between the patterns 210 adjacent in the first direction DR1 may be smaller than the width Wth of the pattern 210. The space SP between two patterns 210 adjacent in the second direction DR2 may be adjacent to the center part of the patterns 210 adjacent in the first direction DR1. That is, a plurality of patterns 210 may be disposed in a zigzag pattern on a plane.

Each of the plurality of patterns 210 may be a hole penetrating the supporting member 200. The hole may have a shape in which a width in the first direction DR1 is gradually narrowed from an upper side to a lower side along the third direction DR3 on the cross-section. That is, the width of the pattern 210 on the upper side surface of the supporting member 200 may be greater than the width of the pattern 210 on the lower side surface (i.e., bottom) of the supporting member 200 in the first direction DR1. However, the present invention is not limited thereto, and the pattern 210 may have a constant width on the cross-section in another embodiment. Also, the hole of the pattern 210 may have a shape in which the width gradually increases from the upper side to the lower side (i.e., bottom) on the cross-section in still another embodiment. The shape of the supporting member 200 of the display device according to an embodiment is not limited thereto, and a variation embodiment is described with reference to FIG. 7.

Figure 7:
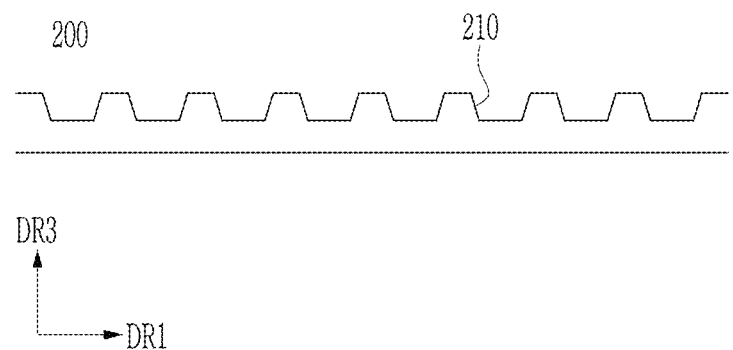
FIG. 7 is a cross-sectional view of a supporting member of a display device according to another embodiment.

FIG. 7 is a cross-sectional view of a supporting member of a display device according to another embodiment.

As shown in FIG. 7, each of a plurality of patterns 210 may be a groove formed with a predetermined depth in the third direction DR3 in one surface of the supporting member 200. In this case, an arrangement type and shape on a plane of a plurality of patterns 210 may be the same as described in the previous embodiment. The depth of the pattern 210 (i.e., length between a top and a bottom of the groove) may be smaller than the thickness of the supporting member 200 (i.e., length between a top and a bottom of the supporting member 200). For example, the depth of the pattern 210 may be about half of the thickness of the supporting member 200. However, this is only an example, and the depth of the pattern 210 may be variously changed. The pattern 210 may have a shape that gradually becomes narrower from the top to the bottom along the third direction DR3 on the cross-section. At this time, the pattern 210 appears on the upper side of the supporting member 200, and the pattern 210 does not appear on the lower side (i.e., bottom). The shape of the pattern 210 is not limited thereto, and may be variously changed.

The supporting member 200 of the display device according to an embodiment includes a plurality of patterns 210 each being a groove or hole shape that extend in a direction parallel to the folding axis FA, so that the third region OA of the supporting member 200 may be flexibly folded. The supporting member 200 is made of or includes a material with high rigidity, such as carbon fiber reinforced plastic, and thus may have overall high strength. In addition, the supporting member 200 may have high flexibility partially by a plurality of patterns 210 formed in the third region OA.

Next, the method of manufacturing the carbon fiber reinforced plastic, which is the material of the supporting member 200 of the display device according to an embodiment, is described with reference to FIG. 8 to FIG. 13.

FIG. 8 to FIG. 13 are views showing a process for molding a material of a supporting member of a display device according to an embodiment.

Figure 8:
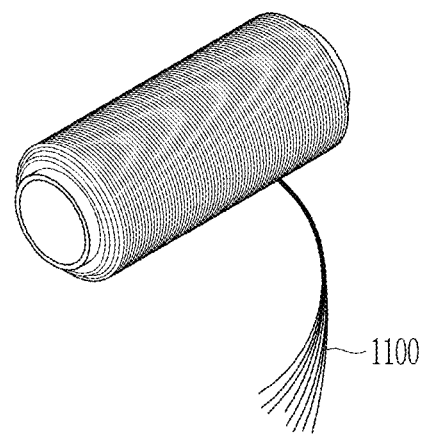
FIG. 8 to FIG. 13 are views showing a process of molding a material of a supporting member of a display device according to an embodiment.

First, as shown in FIG. 8, a carbon filament 1100, which is a basic unit of a carbon fiber, is prepared. The carbon filament 1100 may be made by heating a carbon-nitrogen compound called polyacrylonitrile ("PAN"). When polyacrylonitrile is heated to about 300 degrees Celsius, cyan groups combine with each other to form a ring (an acryl fiber form). When this is put in inert gas and heated to about 700 degrees Celsius, hydrogen attached to the carbon atom of the ring is blown away, and a ring consisting of aromatic pyridine groups is formed (a so-called "carbonization" process).

Figure 9:
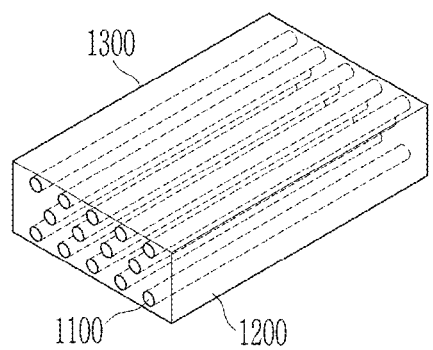

As shown in FIG. 9, the carbon filaments 1100 are disposed side by side in one direction, and a liquid synthetic resin 1200 such as an epoxy resin is penetrated to form a prepreg 1300. At this time, the liquid synthetic resin 1200 is in a semi-cured state, also referred to as B-stage. The prepreg 1300 is an intermediate material of a composite material.

Figure 10:
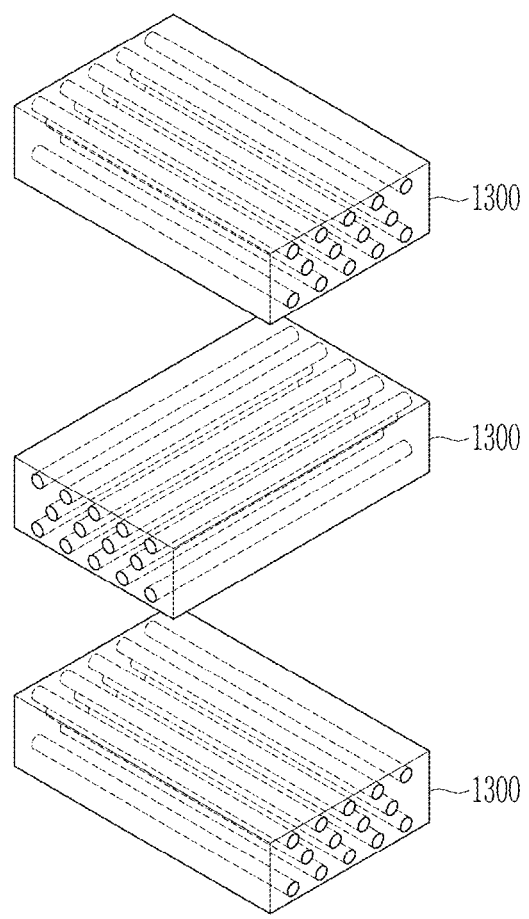

As shown in FIG. 10, a plurality of prepregs 1300 are stacked. For example, three prepregs 1300 can be stacked. However, this is only an example, and the number of stacked prepregs 1300 may be variously changed. A plurality of prepregs 1300 may be stacked in directions crossing each other. The carbon filaments 1100 within adjacent prepregs 1300 may cross each other vertically.

Figure 11:
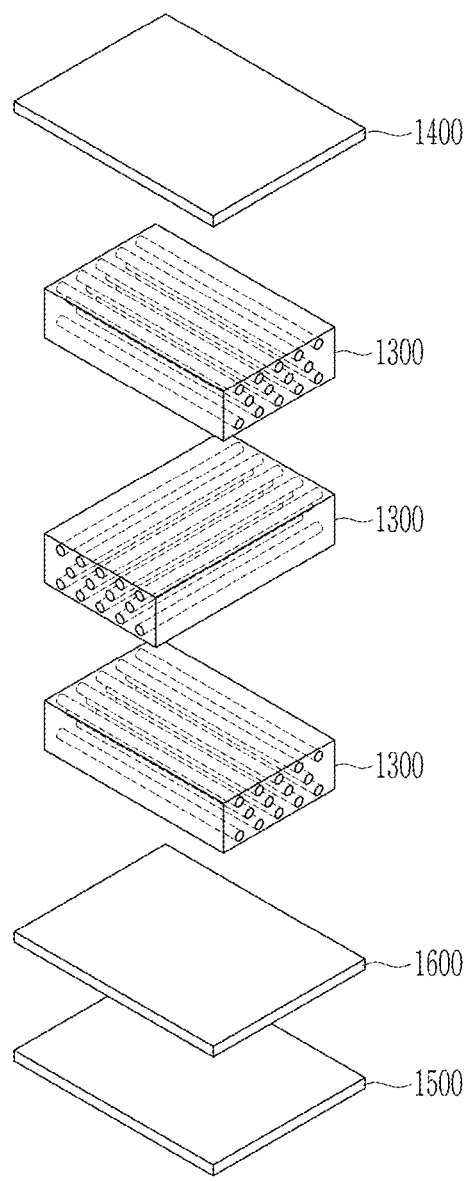

As shown in FIG. 11, molds 1400 and 1500 are provided on opposite sides of the plurality of stacked prepreg 1300. A first mold 1400 is positioned on the plurality of stacked prepregs 1300, and a second mold 1500 is positioned under the plurality of stacked prepregs 1300. Between the prepreg 1300 and the second mold 1500, a releasing film 1600 may be further positioned.

Figure 12:
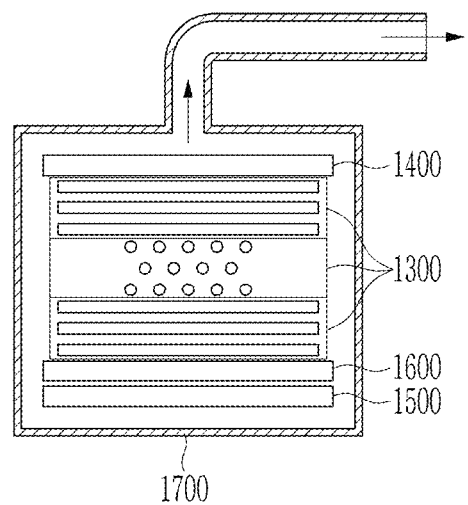

As shown in FIG. 12, the second mold 1500, the releasing film 1600, the prepreg 1300, and the first mold 1400 are placed in a vacuum bag 1700 in a sequentially stacked state. Then, the air inside the vacuum bag 1700 is removed to make the inside of the vacuum bag 1700 in a vacuum state.

Figure 13:
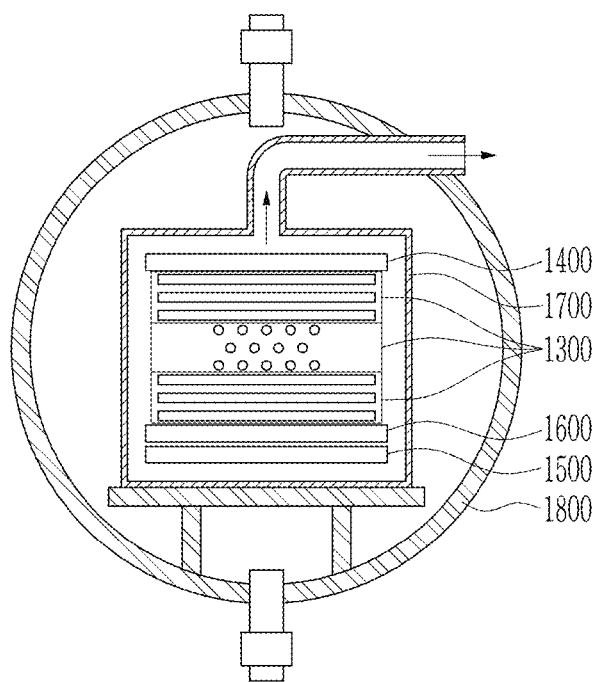

As shown in FIG. 13, the vacuum bag 1700 is placed in an autoclave 1800, and a pressure and heat are applied. The autoclave 1800 is a heat-resistant and pressure-resistant device that performs a chemical reaction, extraction, and sterilization under high temperature and high pressure. The carbon fiber reinforced plastic may be manufactured by forming a plurality of prepregs 1300 by the pressing and heating process in the autoclave 1800.

Hereinafter, the method of manufacturing the supporting member of the display device according to an embodiment using the carbon fiber reinforced plastic is described with reference to FIG. 14 to FIG. 18A.

FIG. 14 to FIG. 18A are process cross-sectional views showing a manufacturing process of a supporting member of a display device according to an embodiment.

Figure 14:
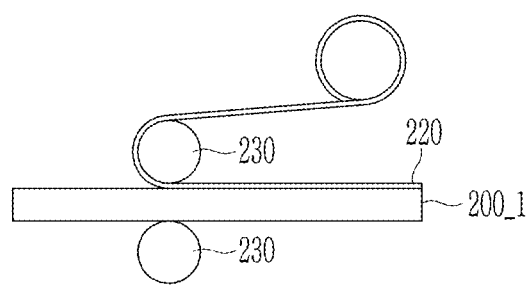
FIG. 14 to FIG. 18A are process cross-sectional views showing a manufacturing process of a supporting member of a display device according to an embodiment.

First, as shown in FIG. 14, a precursory supporting member 200_1 made of a non-metal material is prepared. For example, the precursory supporting member 200_1 may be prepared by manufacturing the carbon fiber reinforced plastic as previously described with reference to FIG. 8 to FIG. 13. However, the material of the precursory supporting member 200_1 is not limited thereto, and may be replaced with another material having high strength and high electrical shielding properties. For example, the precursory supporting member 200_1 may be formed of or include a glass fiber reinforced plastic (GFRP), an aramid fiber reinforced plastic (AFRP), etc.

A dry film 220 is attached on the precursory supporting member 200_1. The dry film 220 is a filmized photosensitive resist. The dry film 220 may be formed of or include a positive film or a negative film. The dry film 220 generally consists of a triple layer sandwiched between a polyester film and a polyethylene film to protect the photosensitive resist. The dry film 220 may be attached by a thermocompression bonding on the precursory supporting member 200_1 using a silicone roll 230. This is referred to as a lamination process.

Figure 15:
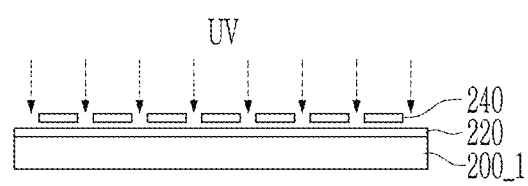

As shown in FIG. 15, a mask 240 is matched with the dry film 220 and an exposure process is performed by irradiating ultraviolet rays ("UV"). The mask 240 has a predetermined pattern, and ultraviolet rays (UV) may pass through some regions of the mask 240, but do not pass through some other regions. Accordingly, some regions of the dry film 220 may be irradiated with ultraviolet rays (UV), and other regions may not be irradiated with ultraviolet rays (UV).

Figure 16:
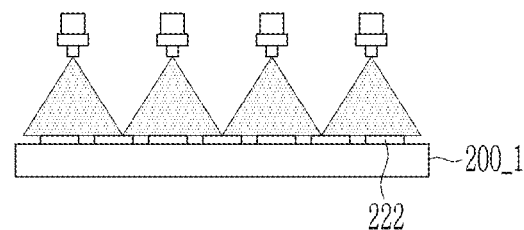

As shown in FIG. 16, some regions of the dry film 220 are removed by proceeding with a development process. In this case, a portion of the dry film 220 to which ultraviolet rays (UV) are irradiated may be removed, and a portion of the dry film 220 to which ultraviolet rays (UV) are not irradiated may remain. Therefore, the shape of the patterned dry film 222 may be similar to the shape of the mask 240. However, the present invention is not limited thereto, and a portion of the dry film 220 that is not irradiated with ultraviolet rays (UV) may be removed, and a portion of the dry film 220 that is irradiated with ultraviolet rays (UV) may remain.

Figure 17:
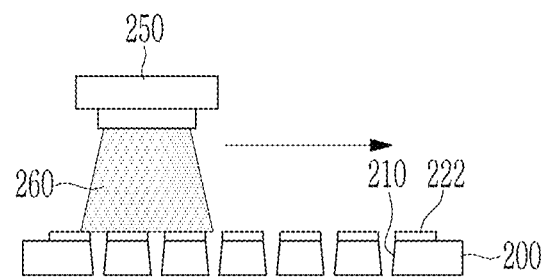

As shown in FIG. 17, a plurality of patterns 210 are formed on the precursory supporting member 200_1 by using the patterned dry film 222 as a mask. A plurality of pattern 210 may be formed by positioning a nozzle 250 on the patterned dry film 222 and supplying fine abrasive particles 260 through the nozzle 250. The pattern 210 may be formed by spraying the fine abrasive particles 260 with high-pressure air from the nozzle 250 to collide with the surface of the precursory supporting member 200_1. In this case, the fine abrasive particles 260 may be made of aluminum oxide (Alumina), and the size of the fine abrasive particles 260 may be about 30 micrometers (μm). This is called a micro blast process. By this process, the precursory supporting member 200_1 becomes a supporting member 200.

The pattern 210 formed by using the micro blast process may have a shape such that the width gradually becomes narrower in the depth direction on the cross-section. That is, the width of the pattern 210 on the upper surface of the supporting member 200 may be greater than the width of the pattern 210 on the lower surface (i.e., bottom) of the supporting member 200. The cross-sectional shape of the pattern may be approximately trapezoidal.

For comparison with the manufacturing method of the supporting member of the display device according to an embodiment, a manufacturing method of a supporting member of a display device according to a reference example may be considered. The supporting member of the display device according to the reference example may be made of a metal, and a pattern may be formed by wet etching. In the case of forming the pattern by the micro blast process, the upper surface of the supporting member is processed to form the pattern. Therefore, the process is performed by attaching the film only to the upper surface of the supporting member and patterning the film. When the pattern is formed by wet etching, the pattern is formed by processing opposite sides of the supporting member. The pattern formed by the wet etching method may have a shape in which the width gradually increases from the top to the center on the cross-section and gradually increases from the bottom to the center. The cross-sectional shape of the pattern may be approximately hexagonal. At this time, each film is attached to the upper surface and the bottom surface of the supporting member and is patterned to carry out the process. The film used at this time is expensive, and if the number of films used in the process is reduced, the processing cost of the supporting member may be reduced. The supporting member of the display device according to an embodiment may reduce the processing cost by reducing the number of films used in the process by half compared to the supporting member of the display device according to the reference example.

Figure 18:
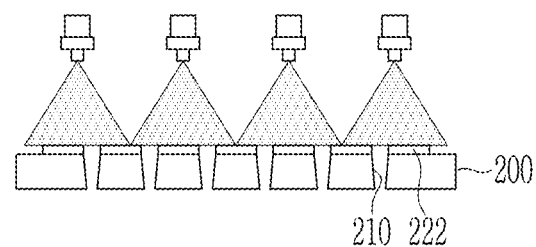
Figure 18A:

As shown in FIG. 18 and FIG. 18A, the patterned dry film 222 is removed. Then, the supporting member 200 on which a plurality of patterns 210 are formed is cleaned to be completed.

Through these processes, the pattern 210 of the supporting member 200 shown in FIG. 5 to FIG. 7 previously described may be formed.

Hereinafter, the supporting member of the display device according to an embodiment is described in comparison with a supporting member of a display device according to a reference example with reference to FIG. 19 to FIG. 21.

Figure 19:
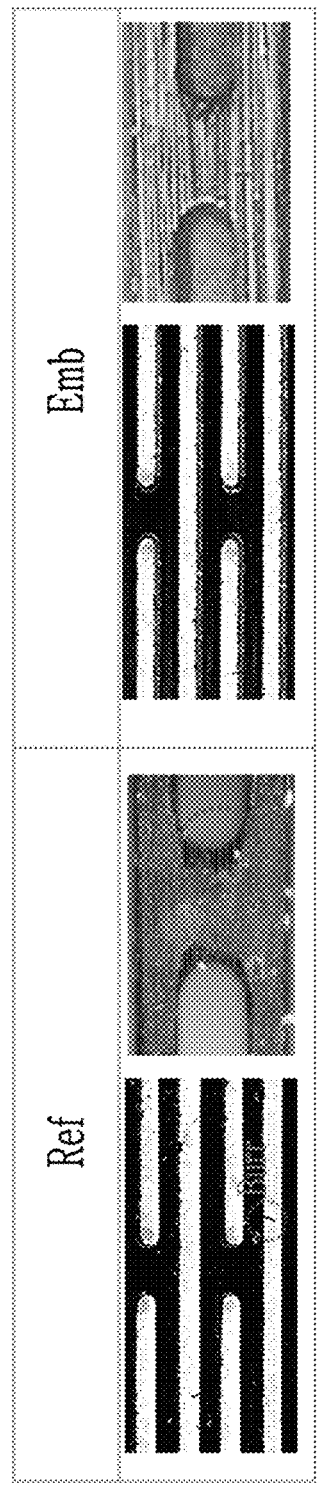
FIG. 19 is a view showing a plane state after processing a supporting member of a display device according to an embodiment and a plane state of a supporting member of a display device according to a reference example.
Figure 20:
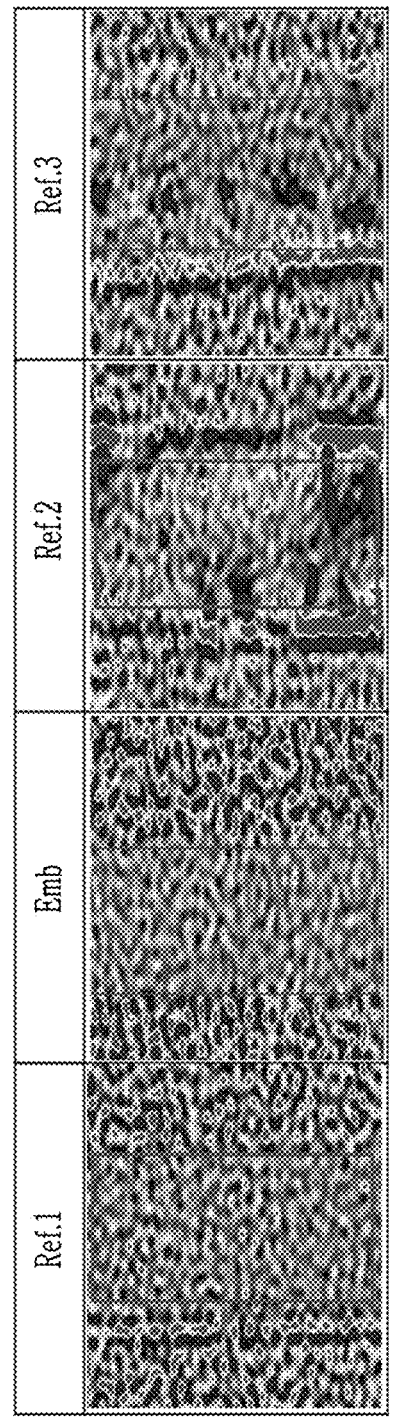
FIG. 20 is a view showing a plane state after processing a supporting member of a display device according to an embodiment and plane states of a supporting member of a display device according to several reference examples.

FIG. 19 is a view showing a plane state after processing a supporting member of a display device according to an embodiment and a plane state of a supporting member of a display device according to a reference example, and FIG. 20 is a view showing a plane state after processing a supporting member of a display device according to an embodiment and plane states of a supporting member of a display device according to several reference examples. FIG. 19 and FIG. 20 show results of observing the appearance after attaching the film on the supporting member after forming the pattern on the supporting member. FIG. 21 is a view showing a cross-section state after processing a supporting member of a display device according to an embodiment and a cross-section state of a supporting member of a display device according to a reference example.

As shown in FIG. 19, a predetermined pattern is formed on the supporting member Ref of the display device according to the reference example. The pattern may be formed on the supporting member Ref of the display device according to the reference example through a laser processing. At this time, it can be seen that burrs are present inside the pattern, and there are traces of thermal damage at the edge of the pattern. By the laser processing, yarns of the carbon fiber reinforced plastic constituting the supporting member may be left protruded into some regions inside the pattern. Also, the edge part of the pattern may be melted by the laser processing, which may be left as a trace of thermal damage.

A predetermined pattern is formed in the supporting member Emb of the display device according to an embodiment. The pattern may be formed on the supporting member Emb of the display device according to an embodiment by using the lamination, the exposure and development process, and the micro blast process using the dry film. At this time, it may be seen that there is no burr inside the pattern, and there is no trace of thermal damage on the edge of the pattern. In the case of performing the processing using the patterning process and micro blast process of the dry film, the damage to the periphery of the pattern may be effectively minimized. It is possible to prevent the yarn of the carbon fiber reinforced plastic constituting the supporting member from remaining inside the pattern, and it is possible to effectively prevent the traces of thermal damage from remaining on the periphery of the pattern. Therefore, it may be seen that the processing state of the pattern of the supporting member Emb of the display device according to an embodiment is better than the processing state of the pattern of the supporting member Ref of the display device according to the reference example.

As shown in FIG. 20, a predetermined pattern is formed on the supporting member Ref. 1 of the display device according to a Reference Example 1. The supporting member Ref. 1 of the display device according to the Reference Example 1 may be made of the metal, and a pattern may be formed by a wet etching method. The portion where the pattern is formed is indicated by a quadrangle. It may be seen that the boundary between the center where the pattern is formed and the part positioned on opposite sides of the pattern is clear.

A predetermined pattern is formed in the supporting member Emb of the display device according to an embodiment. The supporting member Emb of the display device according to an embodiment may be made of the carbon fiber reinforced plastic, and the pattern may be formed by the patterning process and micro blast process of the dry film. The portion where the pattern is formed is indicated by a quadrangle. It may be seen that the boundary between the center where the pattern is formed and the part positioned on opposite sides of the pattern is clear. It may be seen that the processing state of the pattern of the supporting member Emb of the display device according to an embodiment and the supporting member (Ref. 1) of the display device according to Reference Example 1 is similar. However, since the supporting member Emb of the display device according to an embodiment is made of the carbon fiber reinforced plastic, the strength may be higher than that of the supporting member Ref. 1 of the display device according to Reference Example 1. In addition, the supporting member Emb of the display device according to an embodiment forms the pattern using the micro blast process, so it is possible to prevent warping compared to the supporting member Ref. 1 of the display device according to Reference Example 1, and may be advantageous in high productivity. In addition, the wet etching method may be used for the metal processing, but cannot be used for the non-metal processing.

A predetermined pattern is formed in the supporting member of the display device according to a Reference Example 2 (Ref. 2) and the supporting member of the display device according to a Reference Example 3 (Ref. 3), respectively. Through laser processing, the pattern may be formed on the supporting member of the display device according to Reference Example 2 (Ref. 2) and the supporting member of the display device according to Reference Example 3 (Ref. 3). The portion where the pattern is formed is indicated by a quadrangle. It may be seen that the boundary between the center where the pattern is formed and the part positioned on opposite sides of the pattern is unclear. This is because, as described above, burrs are formed inside the pattern, or the traces of the thermal damage are left on the edge of the pattern. Therefore, it may be confirmed that the processing state of the pattern of the supporting member Emb of the display device according to an embodiment is good compared to the processing state of the pattern of the supporting member of the display device according to Reference Example 2 (Ref. 2) and the supporting member of the display device according to Reference Example 3 (Ref. 3).

Figure 21:
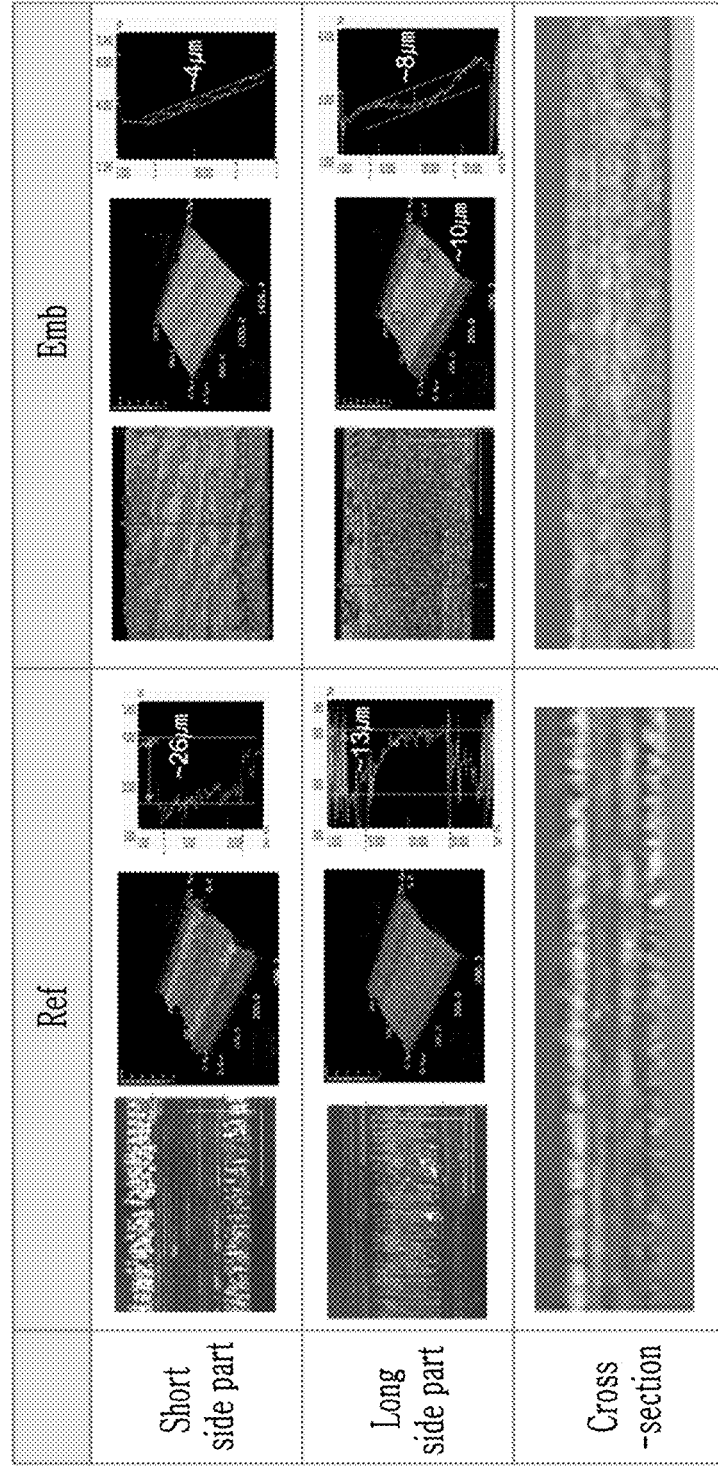
FIG. 21 is a view showing a cross-section state after processing a supporting member of a display device according to an embodiment and a cross-section state of a supporting member of a display device according to a reference example.

As shown in FIG. 21, a predetermined pattern is formed on the supporting member Ref of the display device according to the reference example. The pattern may be formed on the supporting member Ref of the display device according to the reference example through the laser processing. Referring to the cross-sectional shape of the short side part of the pattern, it may be seen that an uneven shape is processed from the top to the bottom. Referring to the cross-sectional shape of the long side part of the pattern, it may be confirmed that it has been processed to have an uneven surface from the top to the bottom. Referring to the overall shape of the cross-section of the pattern, it may be confirmed that the pattern has a non-uniform shape depending on the position.

A predetermined pattern is formed in the supporting member Emb of the display device according to an embodiment. By using the patterning process and micro blast process of the dry film, it is possible to form the pattern on the supporting member Emb of the display device according to an embodiment. Referring to the cross-sectional shape of the short side part of the pattern, it may be confirmed that a uniform slope is formed from the top to the bottom. Referring to the cross-sectional shape of the long side part of the pattern, it may be seen that a uniform inclined surface is formed from the upper surface to the lower surface. Referring to the overall shape of the cross-section of the pattern, it may be confirmed that the pattern has a uniform surface. Therefore, it may be seen that the processing state of the pattern of the supporting member Emb of the display device according to an embodiment is better than the processing state of the pattern of the supporting member Ref of the display device according to the reference example.

Figure 22:
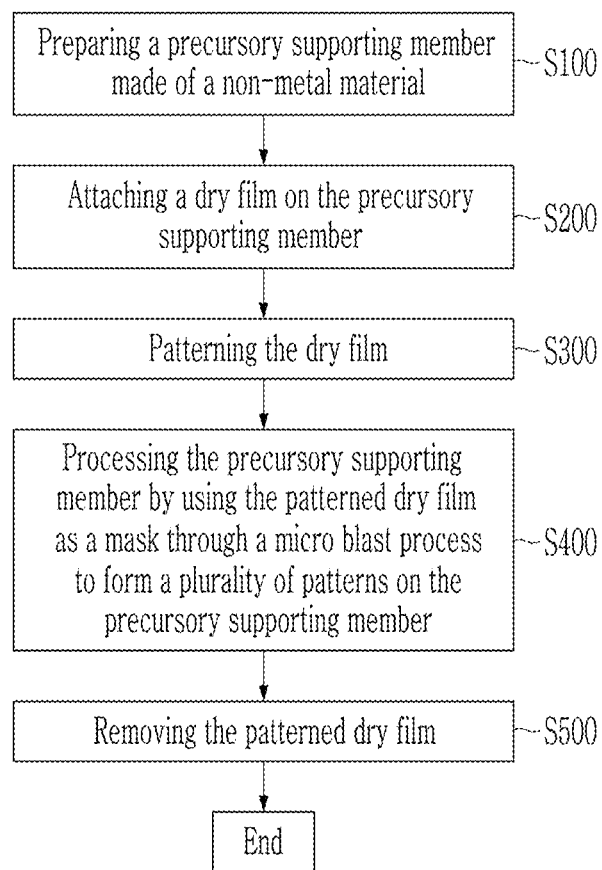
FIG. 22 is a flow chart showing a manufacturing process of a supporting member of a display device according to an embodiment.

FIG. 22 is a flow chart showing a manufacturing process of a supporting member of a display device according to an embodiment.

The manufacturing method of a supporting member for a display device according to an embodiment includes: preparing a precursory supporting member made of a non-metal material (S100); attaching a dry film on the precursory supporting member (S200); patterning the dry film (S300); processing the precursory supporting member by using the patterned dry film as a mask through a micro blast process to form a plurality of patterns on the precursory supporting member (S400), where the precursory supporting member becomes a supporting member after the processing; and removing the patterned dry film (S500).

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: display panel
200: supporting member
LA1: first region
LA2: second region
OA: third region
210: pattern
220: dry film
222: patterned dry film
300: digitizer
400: metal plate

What is claimed is:

1. A supporting member for a display device including a first region, a second region, and a third region positioned between the first region and the second region, comprising
a plurality of patterns positioned in the third region and adjacent to one another along a first direction and a second direction perpendicular to the first direction, wherein each of the plurality of patterns extends along the second direction, each of the plurality of patterns is a groove having a predetermined depth smaller than a thickness of the supporting member, the plurality of patterns appear on an upper side of the supporting member, and the plurality of patterns does not appear on a lower side of the supporting member.

2. The supporting member for the display device of claim 1, wherein the third region is foldable along a folding axis parallel to the second direction, each of the plurality of patterns has a length greater than a width in a plan view, and the length is measured in the second direction, and the width is measured in the first direction.

3. The supporting member for the display device of claim 2, wherein a space between two patterns of the plurality of patterns adjacent in the second direction is adjacent to a center of a pattern of the plurality of patterns adjacent in the first direction.

4. The supporting member for the display device of claim 1, wherein each of the plurality of patterns has a shape such that a width thereof in the first direction gradually becomes narrower toward a bottom thereof on a cross-section.

5. The supporting member for the display device of claim 1, wherein the supporting member is made of a non-metal material.

6. The supporting member for the display device of claim 5, wherein the supporting member is formed of or includes at least one of a carbon fiber reinforced plastic, a glass fiber reinforced plastic, and an aramid fiber reinforced plastic.

7. A display device comprising:

a display panel which displays an image;

a digitizer which detects a touch; and a supporting member positioned between the display panel and the digitizer, wherein the supporting member includes a first region and a second region, and a third region positioned between the first region and the second region, the supporting member includes a plurality of patterns positioned in the third region and adjacent to one another in a first direction and a second direction perpendicular to the first direction, each of the plurality of patterns extends along the second direction, each of the plurality of patterns is a groove having a predetermined depth smaller than a thickness of the supporting member, the plurality of patterns appear on an upper side of the supporting member, and the plurality of patterns does not appear on a lower side of the supporting member.

8. The display device of claim 7, wherein the third region is foldable with respect to a folding axis extended in the second direction, each of the plurality of patterns has a length greater than a width in a plan view, and the length is measured in the second direction, and the width is measured in the first direction.

9. The display device of claim 8, wherein a space between two patterns of the plurality of patterns adjacent in the second direction is adjacent to a center of a pattern of the plurality of patterns adjacent in the first direction.

10. The display device of claim 7, wherein each of the plurality of patterns has a shape such that a width thereof in the first direction gradually becomes narrower toward a bottom thereof on a cross-section.

11. The display device of claim 7, wherein the digitizer includes a first digitizer overlapping the first region of the supporting member and a second digitizer overlapping the second region of the supporting member, and the first digitizer and the second digitizer are separated from each other.

12. The display device of claim 7, further comprising a metal plate positioned under the digitizer, wherein the metal plate includes a first metal plate overlapping the first region of the supporting member and a second metal plate overlapping the second region of the supporting member, and the first metal plate and the second metal plate are separated from each other.

13. The display device of claim 7, wherein the supporting member is made of a non-metal material.

14. The display device of claim 13, wherein the supporting member is formed of or includes at least one of a carbon fiber reinforced plastic, a glass fiber reinforced plastic, and an aramid fiber reinforced plastic.

15. A display device comprising:

a display panel which displays an image;

a digitizer which detects a touch; and a supporting member positioned between the display panel and the digitizer, wherein the supporting member includes a first region and a second region, and a third region positioned between the first region and the second region, the supporting member includes a plurality of patterns positioned in the third region and adjacent to one another in a first direction and a second direction perpendicular to the first direction, each of the plurality of patterns extends along the second direction, the digitizer includes a first digitizer overlapping the first region of the supporting member and a second digitizer overlapping the second region of the supporting member, and the first digitizer and the second digitizer are separated from each other.

16. The display device of claim 15, further comprising a metal plate positioned under the digitizer, wherein the metal plate includes a first metal plate overlapping the first region of the supporting member and a second metal plate overlapping the second region of the supporting member, and the first metal plate and the second metal plate are separated from each other.

17. The display device of claim 15, wherein the third region is foldable with respect to a folding axis extended in the second direction, each of the plurality of patterns has a length greater than a width in a plan view, and the length is measured in the second direction, and the width is measured in the first direction.

18. The display device of claim 17, wherein
a space between two patterns of the plurality of patterns adjacent in the second direction is adjacent to a center of a pattern of the plurality of patterns adjacent in the first direction.

19. The display device of claim 15, wherein
each of the plurality of patterns is a groove, and
each of the plurality of patterns has a shape such that a width thereof in the first direction gradually becomes narrower toward a bottom thereof on a cross-section.

20. The display device of claim 15, wherein
the supporting member is formed of or includes at least one of a carbon fiber reinforced plastic, a glass fiber reinforced plastic, and an aramid fiber reinforced plastic.

* * * * *